US008346435B2

(12) United States Patent
Kurishige et al.

(10) Patent No.: US 8,346,435 B2
(45) Date of Patent: Jan. 1, 2013

(54) MOTOR-DRIVEN POWER STEERING CONTROL DEVICE

(75) Inventors: Masahiko Kurishige, Tokyo (JP); Takayuki Kifuku, Tokyo (JP); Koji Nagao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 176 days.

(21) Appl. No.: 12/866,332

(22) PCT Filed: Oct. 8, 2008

(86) PCT No.: PCT/JP2008/068270
§ 371 (c)(1),
(2), (4) Date: Aug. 5, 2010

(87) PCT Pub. No.: WO2009/122606
PCT Pub. Date: Oct. 8, 2009

(65) Prior Publication Data
US 2010/0324785 A1 Dec. 23, 2010

(30) Foreign Application Priority Data
Apr. 4, 2008 (JP) .................................. 2008-098144

(51) Int. Cl.
A01B 69/00 (2006.01)
(52) U.S. Cl. .......................................... 701/41; 701/42
(58) Field of Classification Search .................. None
See application file for complete search history.

(56) References Cited

U.S. PATENT DOCUMENTS
6,161,068 A * 12/2000 Kurishige et al. ............... 701/41
2010/0235047 A1 9/2010 Kurishige et al.

FOREIGN PATENT DOCUMENTS
JP 2000 168600 6/2000
WO 2007 119333 10/2007

OTHER PUBLICATIONS
U.S. Appl. No. 12/962,191, filed Dec. 7, 2010, Kurishige, et al.
U.S. Appl. No. 12/990,958, filed Nov. 4, 2010, Kurishige, et al.

* cited by examiner

Primary Examiner — Fahd Obeid
(74) Attorney, Agent, or Firm — Oblon, Spivak, McClelland, Maier & Neustadt, L.L.P.

(57) ABSTRACT

Provided is an electric power steering control device capable of performing damping control without current detection to perform stable damping control even when a target current and an actual current value differ from each other. The electric power steering control device includes steering torque detection means for detecting a steering torque, a torque controller for computing an assist torque current, a motor for generating a torque for assisting the steering torque, rotation speed estimation means for estimating a rotation speed of the motor, and a damping controller for computing a damping current by using an estimated value of the rotation speed of the motor. The rotation speed estimating means includes steering component removing means for steering torque, for removing a component due to steering from an output of the steering torque detection means, rotation angle corresponding value computing means for multiplying an output of the steering component removing means for steering torque by an inverse number of a rigidity of a torsion bar and −1 to compute a value corresponding to a rotation angle, and a rotation angle differentiator for differentiating an output of the rotation angle corresponding value computing means to compute a value corresponding to a rotation angular velocity.

3 Claims, 3 Drawing Sheets

MOTOR-DRIVEN POWER STEERING CONTROL DEVICE

TECHNICAL FIELD

The present invention relates to an electric power steering control device for assisting a steering force with a motor.

BACKGROUND ART

A conventional electric power steering control device includes steering torque detection means for detecting a steering torque applied by a driver, a torque controller for computing an assist torque current for assisting the steering torque based on the detected steering torque signal, a motor for generating a torque for assisting the steering torque, rotation speed estimating means for estimating a rotation speed of the motor, a damping controller for computing a damping current to be added to the assist torque current by using an estimated value of the estimated motor rotation speed, motor rotation angle detection means, and motor current detection means. The rotation speed estimating means includes steering component removing means for removing a component due to steering from the detected value of the motor rotation angle and the motor current detection means, and a rotation speed observer configured for a vibration equation having an inertia moment of the motor as an inertia term and a rigidity of a torque sensor as a spring term, the rotation speed observer being for computing the estimated value of the motor rotation speed based on the motor rotation angle and the motor current which are output from the steering component removing means (for example, Patent Document 1).

Patent Document 1: JP 2000-168600 A (Page 10, FIG. 12)

DISCLOSURE OF THE INVENTION

Problem to be Solved by the Invention

The electric power steering control device computes a target current signal flowing through the motor and also controls the current so that the target current signal and an actual current value become equal to each other. For the current control, there are a structure for feeding back the detected current signal detected by a motor current detector to the target current signal, as described in, for example, Patent Document 1, and a method for performing a feed-forward correction for feeding forward an induced voltage to an amount of control in a case where there is no induced voltage, the amount of control being computed based on a coil impedance characteristic from a target torque, by a motor rpm detector, as described in, for example, Non-patent Document 1 (see "Electric Power Steering" by Shimizu et al., Proceedings of Society of Automotive Engineers of Japan, 911 911102, Society of Automotive Engineers of Japan, issued May 1991; hereinafter, referred to as Non-patent Document 1).

The conventional electric power steering control device as described above in Patent Document 1 uses the detected current signal detected by the motor current detector. Therefore, the motor rotation speed may not be estimated in the case where the current control is performed without using the motor current detector, as described in Non-patent Document 1 cited above.

Moreover, although an exemplary structure in which the target current signal is used in place of the detected current signal is described in Patent Document 1 cited above, there is a problem in that the motor rotation speed may not be precisely estimated when a difference is generated between the target current signal of a coil and the actual current due to a temperature characteristic which is a coil impedance characteristic and the like in this case.

The present invention has been made to solve the problems described above, and has an object to provide an electric power steering control device capable of precisely estimating a motor rotation speed to perform damping control even without using a motor current detector.

Means for Solving the Problems

An electric power steering control device according to the present invention includes:
  steering torque detection means for detecting a steering torque applied by a driver from a relative angle of a torsion bar;
  a torque controller for computing an assist torque current for assisting the steering torque based on a steering torque signal detected by the steering torque detection means;
  a motor for generating a torque for assisting the steering torque;
  rotation speed estimation means for estimating a rotation speed of the motor; and
  a damping controller for computing a damping current to be added to the assist torque current by using an estimated value of the estimated rotation speed of the motor,
  in which the rotation speed estimation means includes:
    steering component removing means for steering torque, for removing a component due to steering from an output of the steering torque detection means;
    rotation angle corresponding value computing means for multiplying an output of the steering component removing means for steering torque by an inverse number of a rigidity of the torsion bar and −1 to compute a value corresponding to a rotation angle; and
    a rotation angle differentiator for differentiating an output of the rotation angle corresponding value computing means to compute a value corresponding to a rotation angular velocity.

Effects of the Invention

According to the present invention, an electric power steering control device capable of precisely estimating a motor rotation speed to perform damping control even without using a motor current detector may be provided to achieve remarkable effects that have not been achieved conventionally.

DESCRIPTION OF SYMBOLS

1 torque sensor, 2 phase compensator, 3 torque controller, 4 torque HPF, 5 rotation speed computing unit, 6 damping controller, 7 adder, 8 current controller, 9 motor, 10 induced voltage rotation speed computing unit, 11 rotation speed HPF.

BEST MODE FOR CARRYING OUT THE INVENTION

Hereinafter, an embodiment of the present invention is described based on the drawings.

First Embodiment

Figure 1:
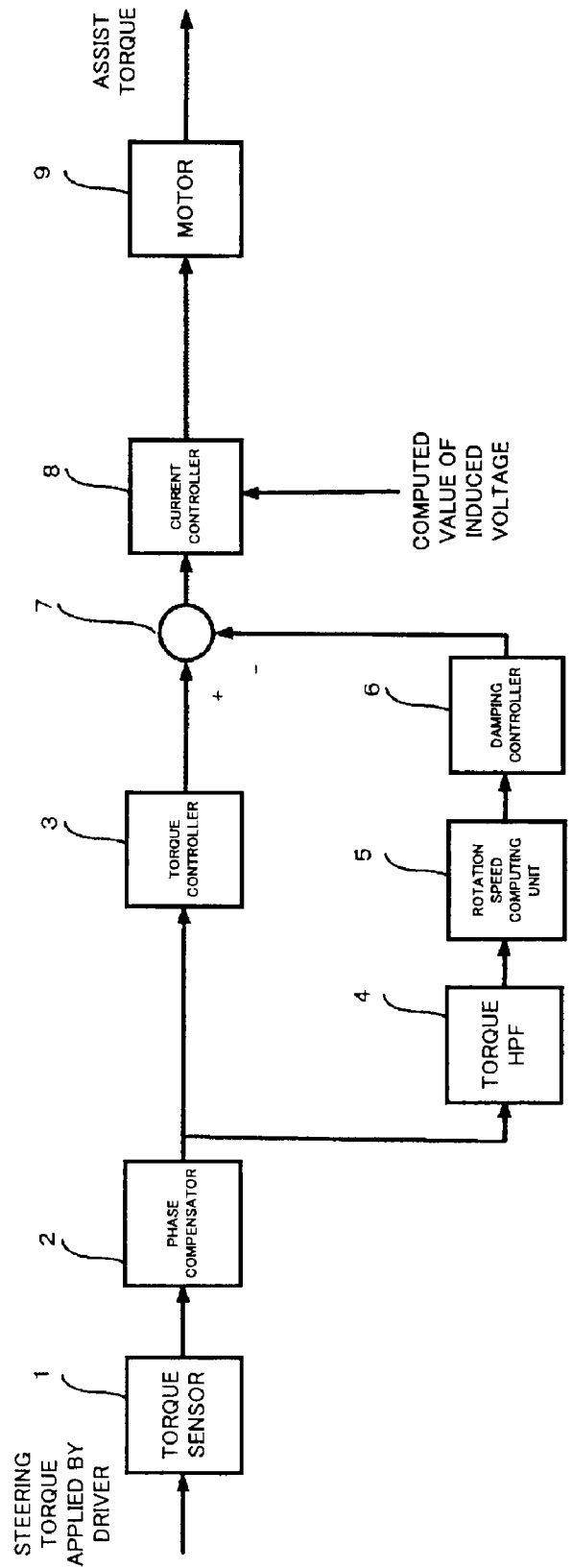
FIG. 1 is a block diagram illustrating a configuration of an electric power steering control device according to a first embodiment of the present invention.

FIG. 1 is a block diagram illustrating a configuration of an electric power steering control device according to a first embodiment of the present invention. In the drawing, there are provided a torque sensor 1 for detecting a steering torque when a driver performs steering, a phase compensator 2 for phase-compensating an output signal of the torque sensor 1 so as to improve a frequency characteristic thereof, a torque controller 3 for computing an assist torque current for assisting the steering torque based on the phase-compensated output of the torque sensor 1, a torque high-pass filter (hereinafter, referred to as a torque HPF) 4 corresponding to steering component removing means for removing a steering frequency component from the output of the torque sensor 1, a rotation speed computing unit 5 for computing a motor rotation speed from an output of the torque HPF, a damping controller 6 for computing a damping current for controlling a damping characteristic of the steering based on an output of the rotation speed computing unit 5, and an adder 7 for adding the assist torque current computed by the torque controller 3 and the damping current computed by the damping controller 6 to compute a target current. In order to generate the assist torque, a current controller 8 performs, for example, a computation for compensating for an induced voltage through an inverse characteristic of a coil impedance on a target current to set a driving voltage command value to be applied to a terminal of a motor 9 so that the current made to flow through the motor 9 becomes equal to the target current, and outputs the driving voltage command value as, for example, a PWM signal.

Figure 2:
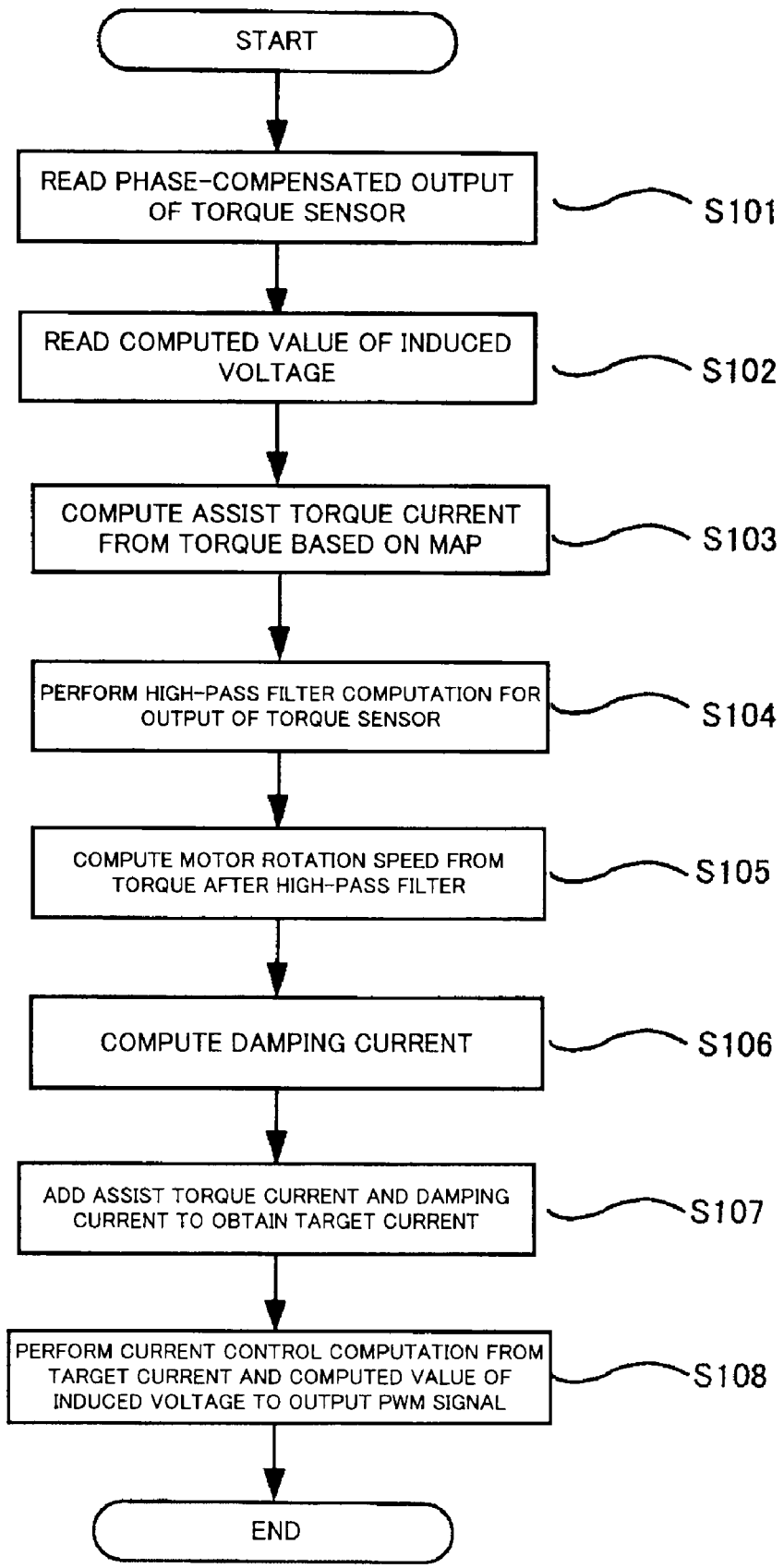
FIG. 2 is a flowchart showing an algorithm of the first embodiment.

Next, an operation of the electric power steering control device having the aforementioned configuration is described based on a flowchart of FIG. 2.

In Step S101, the output of the torque sensor 1, which is phase-compensated by the phase compensator 2, is read into a microcomputer and is stored in a memory. In Step S102, the computed value of the induced voltage is read and is stored in the memory. The computed value of the induced voltage is obtained by multiplying a low-frequency motor angular velocity signal, which is obtained by differentiating an output of a motor rotation angle sensor such as, for example, a resolver, with a low-frequency differentiator including a differentiator, a lowpass filter, and the like, by an induced voltage constant. Next, in Step S103, the phase-compensated output of the torque sensor, which is stored in the memory, is read by the torque controller 3 so that the assist torque current is computed based on a map and is stored in the memory.

In Step S104, the phase-compensated output of the torque sensor, which is stored in the memory, is read by the torque HPF 4 so that the computation with the high-pass filter is performed to obtain a torque HPF output to be stored in the memory. In Step S105, the torque HPF output is multiplied by an inverse number of a rigidity of a torsion bar constituting the torque sensor and −1 to compute the motor rotation speed in the rotation speed computing unit 5. In Step S106, an output of the rotation speed computing unit, which is stored in the memory, is read and is then multiplied by a control gain by the damping controller 6 so as to compute the damping current to be stored in the memory. In Step S107, the assist torque current and the damping current, which are stored in the memory, are added in the adder 7 to obtain the target current to be stored in the memory. In Step S108, a current control computation is performed based on the target current and the computed value of the induced voltage to output the result of computation as the PWM signal for driving the motor 9. An operation from Steps S101 to S108 is repeated for each control sampling. A map showing a relation between the torque sensor output and the assist torque current, which is used in Step S103 described above, a map required for computing the target current such as the control gain for computing the damping current, which is used in Step S107 described above, and constants such as a proportionality constant are preset in a ROM.

Here, the torque HPF 4 corresponding to the steering component removing means is described.

The torque sensor multiplies a relative angle, which is obtained when a handle angle on the upper side of the torsion bar is θh and the motor rotation angle on the lower side of the torsion bar is θc, by a rigidity Ks of the torsion bar to detect the torque signal Ts as expressed by the following Expression (1).

$$Ts = Ks(\theta h - \theta c) \tag{1}$$

At this time, the handle angle θh is determined by steering performed by the driver. The motor rotation angle responds to a frequency as high as a response frequency of the motor. It is known, even when the motor vibrates at a high frequency, the handle angle θh becomes sufficiently smaller than the motor rotation angle θc owing to inertia of the handle.

In general, a frequency at which the driver may perform steering is about 3 Hz or less. Moreover, a steering frequency for, for example, a lane change is around 0.2 Hz. The steering is normally performed at the low frequency as described above in many cases. On the other hand, a frequency band in which a steering oscillation is likely to occur is 30 Hz and higher. Therefore, the frequency band may be separated from the steering frequency.

Thus, in the frequency region in which the steering oscillation occurs, the handle angle θh may be regarded as zero. Hence, the torque signal Ts is obtained as $$Ts = -Ks\theta c \tag{2}$$

In the frequency region in which the steering oscillation occurs, the motor rotation angle θc may be obtained by multiplying the torque signal Ts by the inverse number of the rigidity Ks of the torsion bar and −1, as expressed by the following Expression (3).

$$\theta c = -Ts/Ks \tag{3}$$

Therefore, the torque HPF 4 is configured by a frequency separator for performing a frequency separation of the output of the torque sensor 1, which is phase-compensated by the phase compensator 2, to remove the steering frequency component. As a result, the motor rotation angle, from which the steering component is removed, may be obtained.

In general, when a low-frequency component is desired to be removed, a high-pass filter expressed by a transfer function of the following Expression (4) is used as the frequency separator.

$$T_3 s/(T_3 s + 1) \tag{4}$$

where $T_3$ is a period corresponding to a corner frequency $f_3$ of the high-pass filter ($T_3 = 1/(2\pi f_3)$), specifically, a time constant of the high-pass filter.

At this time, if the corner frequency $f_3$ of the high-pass filter is set low, the component due to steering is more likely to remain. If the corner frequency is set high, a phase shift of the steering oscillation frequency component of the torque signal, which is obtained through the high-pass filter, becomes large. Therefore, by setting the corner frequency $f_3$ of the high-pass filter to any frequency in the range from the frequency at which the steering is normally performed to the frequency at which the steering oscillation occurs, the steering frequency component may be removed to leave the frequency component of the steering oscillation, which is contained in the torque signal.

Thus, in this first embodiment, the high-pass filter having the corner frequency $f_3$ which is set in the range of 0.2 to 30 Hz in consideration of a maximum frequency at which a general driver may perform steering is used as the torque HPF 4 so as to obtain the motor rotation angle from which the steering component is removed.

The thus obtained motor rotation angle, from which steering component is removed, is differentiated to obtain the motor rotation speed.

Figure 3:
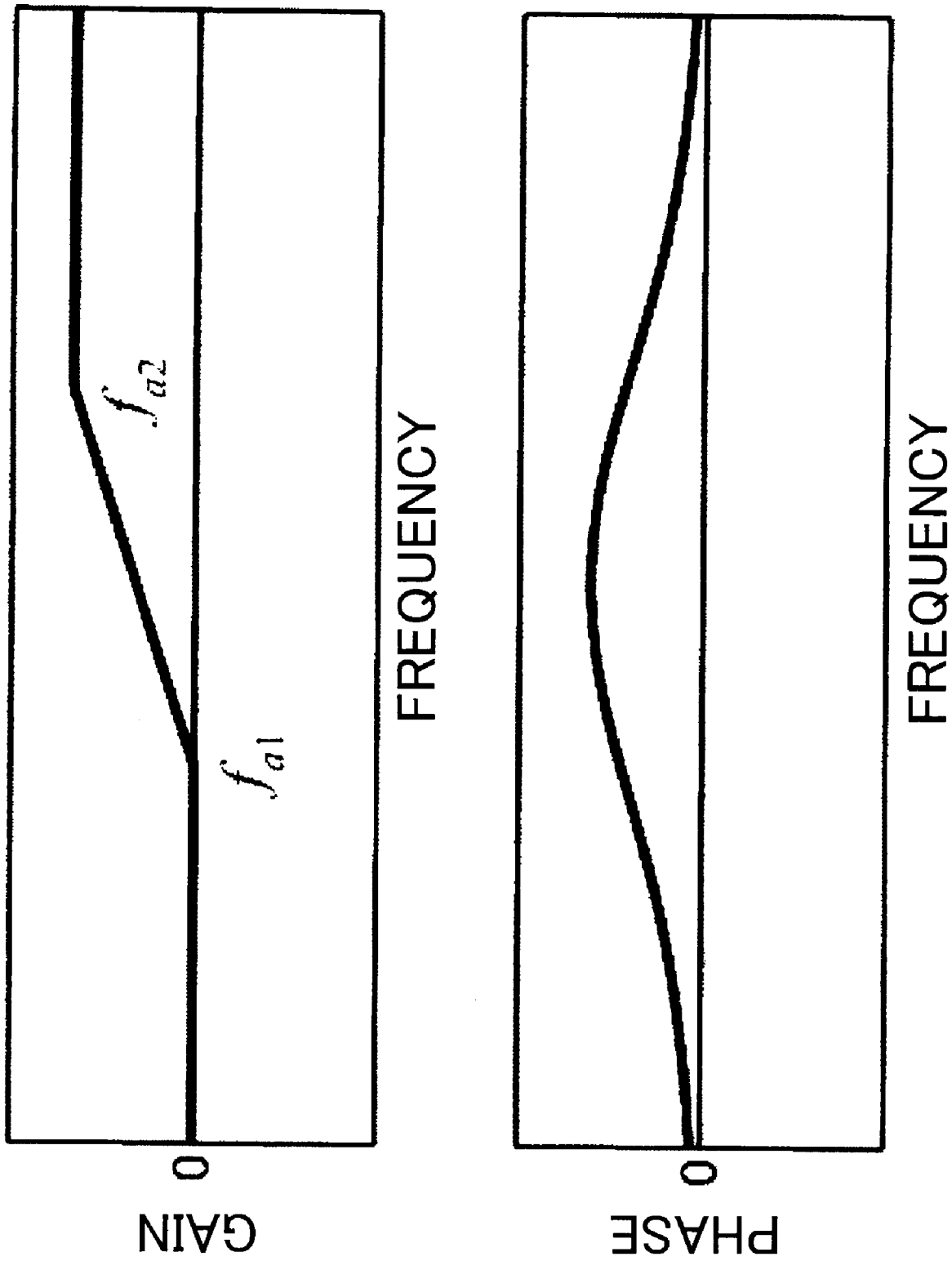
FIG. 3 are graphs showing characteristics of a phase compensator.

The phase compensator 2 is expressed in a transfer function as the following Expression (5) and advances the phase mainly in the frequency range from $f_{a1}=1/(2\pi T_{a1})$ to $f_{a2}=1/(2\pi T_{a2})$.

$$(T_{a1}s+1)/(T_{a2}s+1) \qquad (5)$$

where $f_{a1}$ is a frequency at the start of a rise of the gain of the phase compensator 2, and $f_{a2}$ is a frequency at the end of the rise of the gain (see FIG. 3).

In order to remove the effects of the rise, an anti-phase compensator for removing the effects of the rise may be provided to be used in a stage previous to the torque HPF 4.

Moreover, by making the time constant $T_3$ of the high-pass filter equal to $T_{a1}$, a total transfer function is obtained as $$T_3 s/(T_{a2}s+1) \qquad (6)$$

Therefore, the resulting characteristic is obtained by multiplying the result obtained by the differentiator by the result obtained by the lowpass filter.

In general, $f_{a2}$ is frequently set to 100 Hz or higher. Thus, if $f_{a2}$ is sufficiently higher than the steering oscillation frequency, the motor rotation speed may be obtained without differentiating the torque signal having a lowered resolution after A/D conversion. When the low-frequency component is desired to be further reduced, an additional high-pass filter may be provided in another stage.

As described above, this first embodiment has the structure in which the dumping current is computed based on the rotation speed computed from the torque signal from which the steering frequency component is removed. Therefore, even when the torque proportional gain, which is a gradient of the map showing the relation between the torque sensor output and the assist torque current, is increased, a control system may be prevented from oscillating.

Thus, the damping control gain of the damping controller 6 may be increased so that the damping works effectively. As a result, the steering torque may be reduced while the vibration of the handle is prevented from being felt by the driver.

The invention claimed is:

1. An electric power steering control device, comprising:
    steering torque detector for detecting a steering torque applied by a driver from a relative angle of a torsion bar;
    a torque controller for computing an assist torque current for assisting the steering torque based on a steering torque signal detected by the steering torque detector;
    a motor for generating a torque for assisting the steering torque;
    a rotation speed estimator for estimating a rotation speed of the motor; and
    a damping controller for computing a damping current to be added to the assist torque current by using an estimated value of the estimated rotation speed of the motor,
    wherein the rotation speed estimator includes:
        a steering component removing part for steering torque, for removing a component due to steering from an output of the steering torque detector;
        a rotation angle corresponding value computing part for multiplying an output of the steering component removing part for steering torque by an inverse number of a rigidity of the torsion bar and −1 to compute a value corresponding to a rotation angle; and
        a rotation angle differentiator for differentiating an output of the rotation angle corresponding value computing part to compute a value corresponding to a rotation angular velocity.

2. An electric power steering control device according to claim 1, further comprising a phase-advance compensator for improving a frequency characteristic of the steering torque detector, wherein:
    the torque controller computes the assist torque current for assisting the steering torque based on the output of the steering torque detector after a phase-advance compensation;
    the steering component removing part for steering torque removes the component due to steering from the output of the steering torque detector after the phase-advance compensation and sets so that a value of a numerator of a transfer function of the phase-advance compensator and a value of a denominator of a transfer function of the steering component removing part for steering torque become equal to each other; and
    the rotation speed estimator multiplies the output of the steering component removing part for steering torque by the inverse number of the rigidity of the torsion bar and −1 to compute the value corresponding to the rotation angular velocity.

3. An electric power steering control device according to claim 2, wherein the steering component removing part for steering torque includes high-pass filters provided in two stages.

* * * * *